(12) United States Patent
Heer

(10) Patent No.: US 7,194,345 B2
(45) Date of Patent: Mar. 20, 2007

(54) COMPRESSED AIR PROCESSING SYSTEM FOR MOTOR VEHICLES

(75) Inventor: Siegfried Heer, Wiesloch (DE)

(73) Assignee: Haldex Brake Products GmbH (DE)

( * ) Notice: Subject to any disclaimer, the term of this patent is extended or adjusted under 35 U.S.C. 154(b) by 217 days.

(21) Appl. No.: 10/816,449

(22) Filed: Apr. 1, 2004

(65) Prior Publication Data

US 2004/0199312 A1    Oct. 7, 2004

(30) Foreign Application Priority Data

Apr. 1, 2003    (DE) ................ 103 14 643

(51) Int. Cl.
*G06F 7/00*    (2006.01)
*F02B 1/12*    (2006.01)

(52) U.S. Cl. ............... 701/36; 701/48; 123/27 R
(58) Field of Classification Search ........... 701/36–37, 701/48, 91, 100; 123/27 R; 280/5.5, 441; 303/32

See application file for complete search history.

(56) References Cited

U.S. PATENT DOCUMENTS

| | | | | |
|---|---|---|---|---|
| 4,673,222 A * | 6/1987 | Knight | ............. | 303/9 |
| 4,817,502 A * | 4/1989 | Seegers | ............. | 91/446 |
| 5,351,776 A | 10/1994 | Keller et al. | ............. | 180/79.1 |
| 5,678,900 A | 10/1997 | Blanz | ............. | 303/6.01 |
| 6,540,308 B1 * | 4/2003 | Hilberer | ............. | 303/6.01 |
| 2004/0195910 A1* | 10/2004 | Aumuller et al. | ............. | 303/15 |

FOREIGN PATENT DOCUMENTS

| | | |
|---|---|---|
| DE | 41 11 023 C2 | 10/1992 |
| DE | 195 44 621 | 1/1997 |
| DE | 196 38 226 | 2/1998 |
| DE | 198 34 705 C2 | 2/2000 |
| DE | 198 35 638 | 2/2000 |
| DE | 101 25 204 A1 | 1/2002 |
| DE | 100 38 266 A1 | 2/2002 |
| EP | 0 831 383 | 11/1999 |
| EP | 0 776 807 | 5/2001 |

* cited by examiner

*Primary Examiner*—Y. Beaulieu
(74) *Attorney, Agent, or Firm*—St. Onge Steward Johnston & Reens LLC

(57) ABSTRACT

A compressed air processing system for motor vehicles includes a pressure control unit, an air dryer, a multi-circuit protection valve and an electronic control unit. The electronic control unit controls the valves of the pressure control unit, the valves of the air dryer, the valves of the multi-circuit protection valve and the valves of an air suspension system of the motor vehicle.

20 Claims, 6 Drawing Sheets

COMPRESSED AIR PROCESSING SYSTEM FOR MOTOR VEHICLES

CROSS REFERENCE TO RELATED APPLICATIONS

This application claims priority to co-pending German Patent Application No. 103 14 643 entitled "Druckluftaufbereitungseinrichtung für Kraftfahrzeug-Druckluftanlagen", filed Apr. 1, 2003.

FIELD OF THE INVENTION

The present invention generally relates to a compressed air processing system of a compressed air system of a motor vehicle. Such compressed air processing systems usually include the elements of a pressure control unit, an air dryer and a multi-circuit protection valve including overflow valves. In addition, the compressed air processing system includes an electronic control unit serving to control the valves of the pressure control unit, the air dryer and the multi-circuit protection valve.

BACKGROUND OF THE INVENTION

Compressed air processing systems are known from German Patent No. DE 195 44 621 C1 corresponding to European Patent No. EP 0 776 807 B1, German Patent No. DE 196 38 226 C1 corresponding to European Patent No. EP 0 831 383 B1 and from German Patent No. DE 198 34 705 C2. These known compressed air processing systems include a common structural unit being formed by the pressure control unit, the air dryer and a multi-circuit protection valve. The multi-circuit protection valve for each circuit includes an overflow valve having limited backflow. Conduits lead from the overflow valve to the respective circuits. Usually, the containers of the circuits I and II are associated with the two circuits of an overall brake system. Additional circuits serve to supply the hand brake valve and secondary aggregates. In this way, there may also be a fifth circuit including an overflow valve of the multi-circuit protection valve and leading to a reservoir container via a conduit. The reservoir container is connected to the air suspension system of the motor vehicle. In this way, an air suspension system is supplied with compressed air. The known compressed air processing systems also include an electronic control unit, meaning a special control unit being coordinated with the compressed air processing system with which the respective valves of the pressure control unit, the air dryer and the multi-circuit protection valve are controlled.

An air suspension system for motor vehicles is known from German Patent Application No. DE 101 25 204 A1. The system is especially adapted to motor vehicles including air suspension. The system includes a level control unit for the respective suspension elements being located close to the wheels of the motor vehicle. The level control unit is supplied with electric potential by a battery, and it is connected to an electric CAN bus line such that the level control unit receives and processes electric signals. A common control line leads to the wheels and to the suspension elements, respectively, of an axle and thus to the right side and the left side of the motor vehicle. German Patent Application No. DE 101 25 204 A1 does not disclose whether the line is an electric line or a pneumatic control line. Furthermore, there is no disclosure concerning a compressed air processing system.

A method of filling an air suspension system by an air dryer is known from German Patent Application No. DE 100 38 266 A1. A compressor and an air dryer being located downstream of the compressor serve to supply and control the air suspension system. Downstream of a check valve being bypassed by a throttle, supply lines lead to controllable way valves being associated with the respective air suspension bellow. The pressure control unit further includes an exit valve. The pressure control unit may also be operated to serve for regeneration of the air dryer. An electronic control unit is associated with the air suspension system. The electronic control unit exclusively controls the elements of the air suspension system and the associated compressed air processing system. German Patent Application No. DE 10 38 266 A1 does not disclose any features of a brake system.

It is also known that trucks include a pneumatic brake system and a pneumatic air suspension system. The air suspension system is supplied with compressed air by a circuit of the compressed air processing system. This circuit is arranged in addition to the brake circuits. The air suspension system includes a plurality of valves at least partly being designed as electrically controllable solenoid valves. A separate electronic control unit serves to control these solenoid valves of the air suspension system. The separate electronic control unit is arranged at a different place than the electronic control unit of the air suspension system. For example, the separate electronic control unit is located in the region of the drivers cabin. Respective electric lines lead from the separate control unit to the solenoid valves of the air suspension systems. The structural expenditure and the assembly expenditure for the two electronic control units are substantial. In addition, the number of connections for electric supply of the two electronic control units and the number of pneumatic conduits on the motor vehicle is comparatively great.

An electronic system for a motor vehicle is known from German Patent No. DE 41 11 023 C2 corresponding to U.S. Pat. No. 5,351,776. The system includes a separate special control apparatus being associated with the respective element of the motor vehicle. For example, there is a special control apparatus for the motor, a special control apparatus for the transmission and a special control apparatus for the brake. A central control apparatus is arranged upstream of these special control apparatuses. The central control apparatus and the special control apparatuses are connected by bus lines such that electronic signals may be transmitted.

SUMMARY OF THE INVENTION

The present invention relates to a compressed air processing system for motor vehicles. The compressed air processing system includes a pressure control unit including at least one valve, an air dryer including at least one valve, a multi-circuit protection valve including at least one valve and an electronic control unit. The electronic control unit controls the at least one valve of the pressure control unit, the at least one valve of the air dryer, the at least one valve of the multi-circuit protection valve and at least one valve of an air suspension system of the motor vehicle.

The present invention also relates to a compressed air system including a compressed air processing system and an air suspension system.

With the novel compressed air processing system, the required structural expenditure for a compressed air processing system and an air suspension system both being located on a motor vehicle is substantially reduced. In the novel compressed air processing system, the electronic control unit of the compressed air processing system is designed and arranged to also control at least one valve of an air suspension system.

The novel compressed air processing system includes a common electronic control unit instead of two locally and functionally separated control units known in the art. The common electronic control unit fulfills the functions required to process compressed air as well as the functions of supplying and controlling the air suspension system. In this way, not only the space requirement, but also the number of electric and pneumatic connecting lines and conduits is reduced. The spaced apart arrangement known in the art is abolished, and it is now possible to arrange the elements of the common electronic control unit at reduced space requirement. Despite the combination of the known two electronic control units to one novel common unit, the pneumatic elements of the compressed air processing system and of the air suspension system may be arranged in a spaced apart manner. However, it is also possible to arrange these elements in one place. The chosen arrangement depends on the respective case of application. A plurality of integration levels is imaginable. Furthermore, the electric elements of the electronic control unit and the pneumatic elements of the compressed air processing system and the pneumatic elements of the air suspension system (especially the valves) may be arranged in one common structural unit.

It is especially preferred if the valves of the compressed air control unit, the air dryer, the multi-circuit protection valve and the air suspension system are combined in one common structural unit. For example, the pneumatic elements may be arranged in one common housing. It is also possible to arrange the pneumatic elements of the compressed air processing system in a first partial housing and the elements of the air suspension system in a second partial housing, and to interconnect the two partial housings.

The integration of the elements may be further increased by also relating to the common electronic control unit. In this way, one attains a common structural unit including the valves of the pressure control unit, the air dryer, the multi-circuit protection valve and the air suspension system, on the one hand, and of the common electronic control unit, on the other hand.

However, it is also possible that the compressed air processing system further includes a first structural unit (in which the at least one valve of the pressure control unit, the at least one valve of the air dryer and the at least one valve of the multi-circuit protection valve are arranged), a second structural unit (in which the at least one valve of the air suspension system is arranged, a pneumatic conduit, the pneumatic conduit being designed and arranged to connect the first structural unit with the second structural unit), a first electric line, (the first electric line being designed and arranged to connect the common electronic control unit with the first structural unit), and a second electric line (the second electric line being designed and arranged to connect the common electronic control unit with the second structural unit). This arrangement may or may not include a compressed air container. When the system does include a compressed air container, electronic control of the valves of the compressed air processing system is realized in a way that the associated overflow valves are opened when the overall brake circuits are correctly filled. Consequently, the valves of the air suspension system are supplied with compressed air.

There also is the possibility of the at least one valve of the pressure control unit, the at least one valve of the air dryer, the at least one valve of the multi-circuit protection valve and the common electronic control unit are designed and arranged to form a common structural unit. On the other hand, it is possible to integrate the elements to form a structural unit including the valves of the air suspension system such that the structural unit including the pneumatic elements of the compressed air processing system does not include its own electronic control unit.

Especially, the common electronic control unit further includes a common processor being designed and arranged to evaluate and control the at least one valve of the pressure control unit, the at least one valve of the air dryer, the at least one valve of the multi-circuit protection valve and the at least one valve of the air suspension system. In this way, signals of pressure sensors, for example, may be used in two ways, meaning to process compressed air and for the air suspension system. The elements may also be coordinated in a way, for example, that the common electronic control unit is designed in a way that preferred filling of the two overall brake circuits is achieved before the air suspension system is supplied with compressed air, and vice versa.

The common electronic control unit makes it possible to fulfill the requirements of the compressed air processing system, on the one hand, and of the air suspension system, on the other hand, in an easy way by coordinating these requirements with one another.

It is possible that the compressed air processing system further includes a pilot valve, the pilot valve being designed and arranged to control the at least one valve of the pressure control unit and the at least one valve of the air suspension system. In this way, the common pilot valve is used during processing of compressed air and during control of the air suspension system.

When the compressed air processing system further includes a pilot valve, there especially is the possibility of the pilot valve being designed and arranged to control the at least one valve of the air dryer and the at least one valve of the air suspension system. It is to be understood that supply of the valves of the air suspension system from the reservoir containers of the overall brake circuits is possible when the overall brake circuits are correctly filled and the corresponding overflow valves are opened.

In all exemplary embodiments of the novel compressed air processing system as described hereinabove, there may be an additional display unit being connected with the common electronic control unit by a data line. Such a display unit or monitor preferably is located in the driver's cabin of the motor vehicle. The display unit allows for data exchange over a CAN bus. The respective operational conditions of the valves, for example of the valves controlling the air suspension system, may be transmitted over this data line. The display unit may also include operational controls especially when it is located in the driver's cabin. In this way, the driver may lift or lower the rear axle of the motor vehicle or affect other control processes, for example.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION OF DRAWINGS

Figure 1:
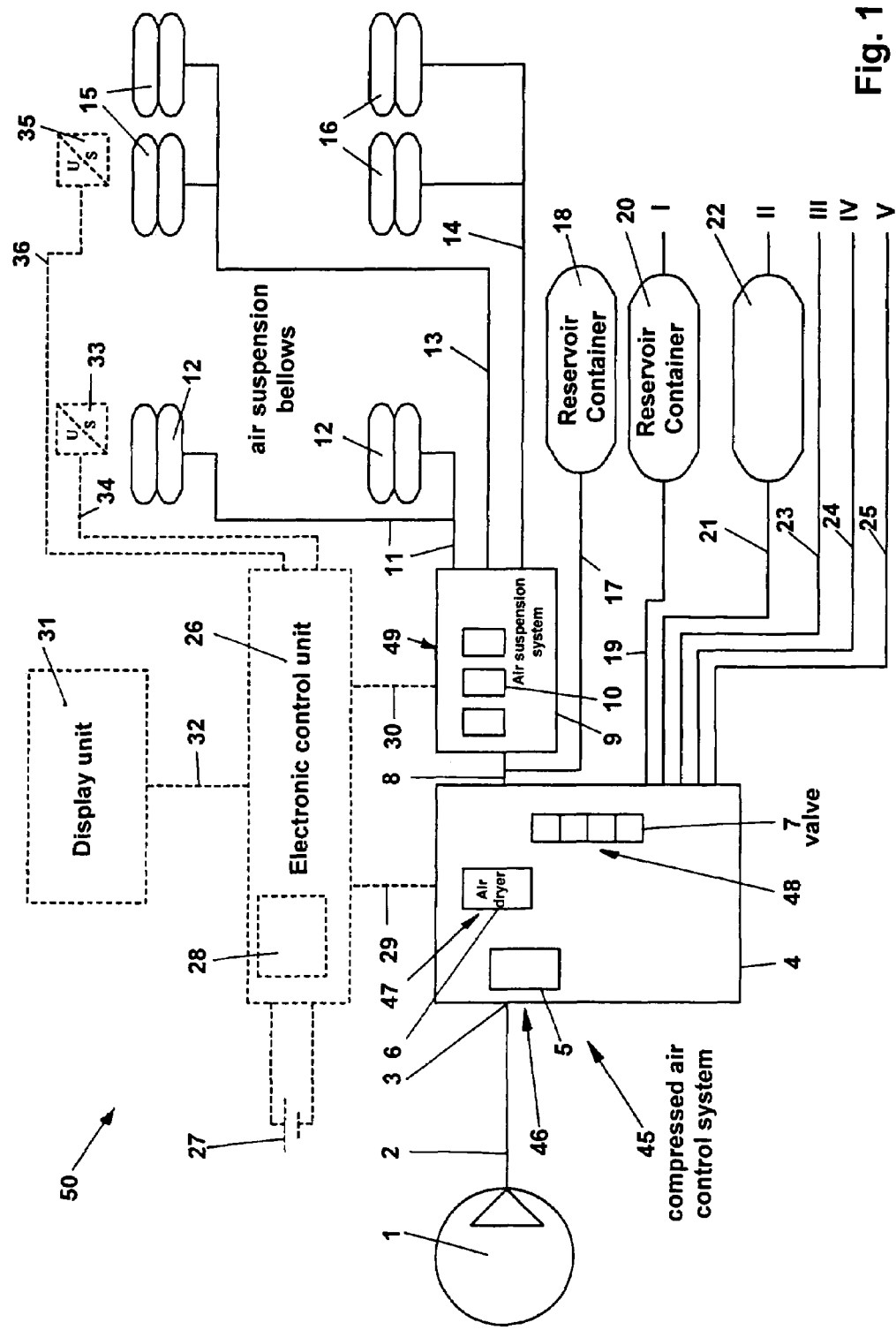
In FIG. 1 is a schematic view of a connection diagram of a first exemplary embodiment of the novel compressed air processing system and of an air suspension system of a motor vehicle.

Referring now in greater detail to the drawings, FIG. 1 (as well as the following figures) illustrates pneumatic elements and parts with a continuous line, while electric elements and wires are illustrated in broken lines.

The novel compressed air system 50 includes a pneumatic conduit 2 which leads from a compressor 1 to a connection 3 being located at a structural unit 4. The structural unit 4 may especially be designed as a common housing. Valves 5 of a pressure control system 46, valves 6 of an air dryer 47 and valves 7 of a multi-circuit protection valve 48 are arranged in the structural unit 4. The valves are illustrated in a symbolic way. The aforementioned elements are interconnected in a known way such that they fulfill the function of processing compressed air. A pneumatic connecting conduit 8 leads from the structural unit 4 to a structural unit 9. The structural unit 9 may also be designed as a housing. The structural unit 9 includes one or move valves 10 of an air suspension system 49. A pneumatic conduit 11 leads from the structural unit 9 to the air suspension bellows 12. For example, these air suspension bellows 12 are associated with the front axle of a car and of a truck (not illustrated), respectively. Additional pneumatic conduits 13 and 14 lead to air suspension bellows 15 and 16, respectively. For example, the air suspension bellows 15 and 16 are associated with the right side and the left side of a rear axle being designed as a twin axle.

The connecting conduit 8 connects the structural unit 4 with the structural unit 9. A reservoir container 18 is associated with the air suspension system 49. Compressed air may reach the reservoir container 18 via a conduit 17 being connected to the conduit 8. Furthermore, a conduit 19 leads from the respective overflow valve of the valves 7 of the multi-circuit protection valve 48 to a reservoir container 20 representing a first circuit I. This circuit I usually is the first circuit of the overall brake system of the motor vehicle. A conduit 21 leads from a reservoir container 22 to a circuit II by which a second overall brake circuit is supplied with compressed air. Additional conduits 23, 24 and 25 may be associated with the trailer brake system of the motor vehicle, the spring brake system and the respective secondary consumers, respectively. The circuits III to V do not necessarily have to include reservoir containers.

A common electronic control unit 26 is supplied with electric potential by lines 27. A common processor 28 is part of the control unit 26. The processor 28 is only schematically illustrated. Furthermore, the electronic control unit 26 includes a number of watch elements and control elements such as sensors, measuring bridges, amplifiers, evaluation units, memory, control units and the like, for example. These elements are located inside of the common electronic control unit 26 in a way that the electronic control unit 26 is capable of controlling the elements and the valves 5, 6, 7, respectively, in the structural unit 4 serving to process compressed air as well as the elements of the structural unit 9. In case the compressor 1 is also controlled, this may also be achieved by the common control unit 26. Data exchange between the structural units 4 and 9 and the common control unit 6 is realized by the lines 29 and 30, respectively. It is preferred to arrange a display unit 31 which preferably is located in the cabin of the motor vehicle. The display unit 31 is connected with the control unit 26 via a line 32. Data exchange via this line 32 may be realized by a control area network bus (CAN bus). Further transmission and exchange of further data may also be realized by a CAN bus line the connection of which is known in the art and therefore not explained in greater detail herein.

A path sensor 33 is associated with the front axle. A line 34 leads from the path sensor 33 to the electronic control unit 26. Similar thereto, there is a path sensor 35 for the rear axle. The potential signals of the path sensor are transmitted to the control unit 26 via a line 36.

Figure 2:
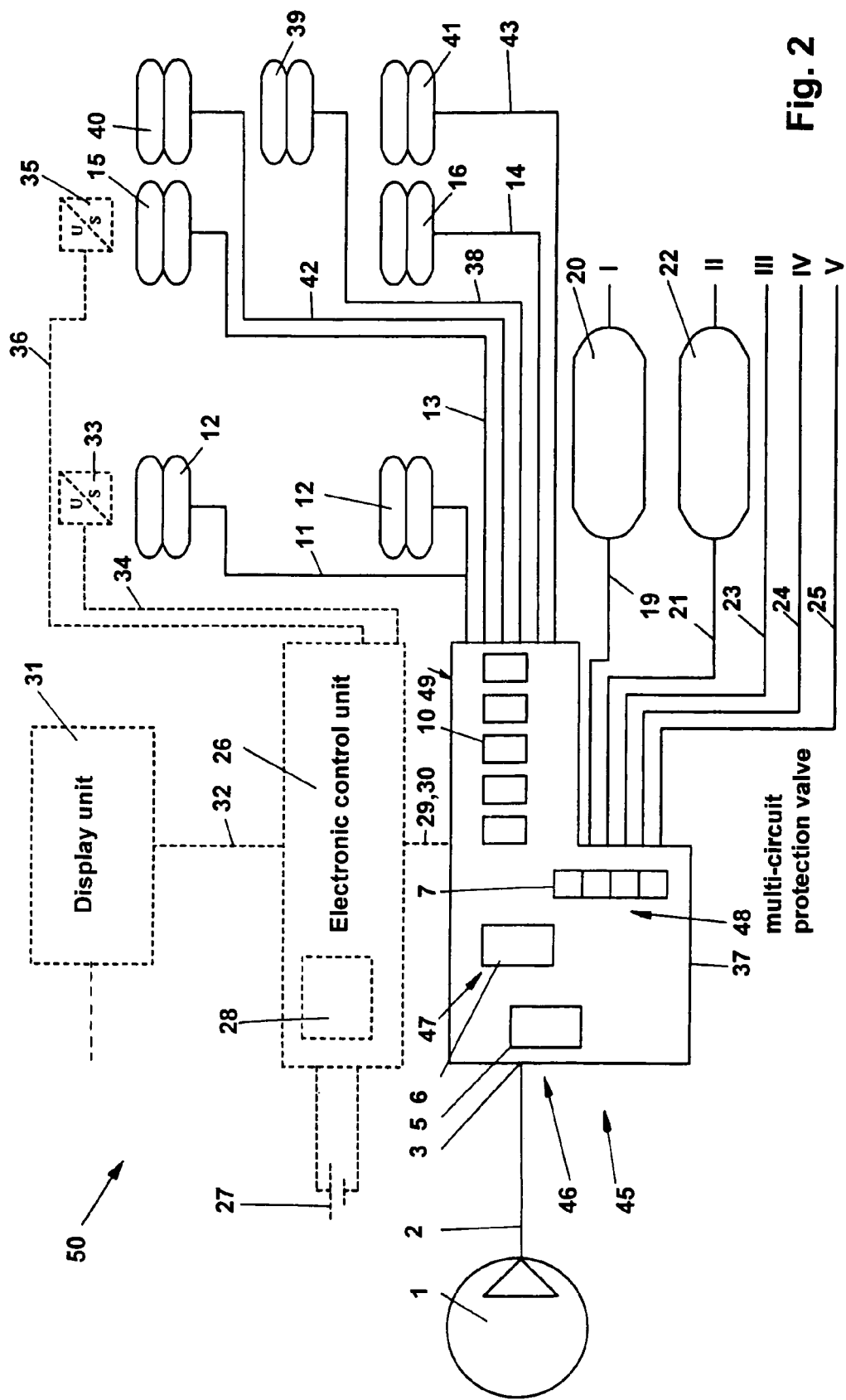
FIG. 2 is a schematic view of a connecting diagram of a second exemplary embodiment of the novel compressed air processing system.

FIG. 2 illustrates another exemplary embodiment of the novel compressed air control system 45 by means of a schematic connection diagram. With respect to the common elements of the system 45, it is referred to the description of the system illustrated in FIG. 1. In contrast to the system as illustrated in FIG. 1, the system 45 illustrated in FIG. 2 includes structural units 4 and 9 of FIG. 1 (not shown in FIG. 2) being combined to form one common structural unit 37. In this way, the valves 5 of the pressure controller 46, the valves 6 of the air dryer 47 and the valves 10 of the air suspension system 49 are commonly arranged, for example in a common housing. The electric connections between the common control unit 26 and the common structural unit 37 may be realized by one common line corresponding to lines 29, 30.

In addition to the elements known from FIG. 1, there further is a conduit 38 leading to a lifting bellow 39 of a lifting axle being located in the region of the rear axle. The conduit 8 of FIG. 1 (not shown in FIG. 2) is arranged within the common structural unit 37. Without being connected to the valves 7 of the multi-circuit protection valve 48, the conduit 8 of FIG. 1 (not shown in FIG. 2) is supplied with compressed air. The air suspension bellows 40 and 41 of the lifting axle are supplied with compressed air via conduits 42 and 43, respectively.

Figure 3:
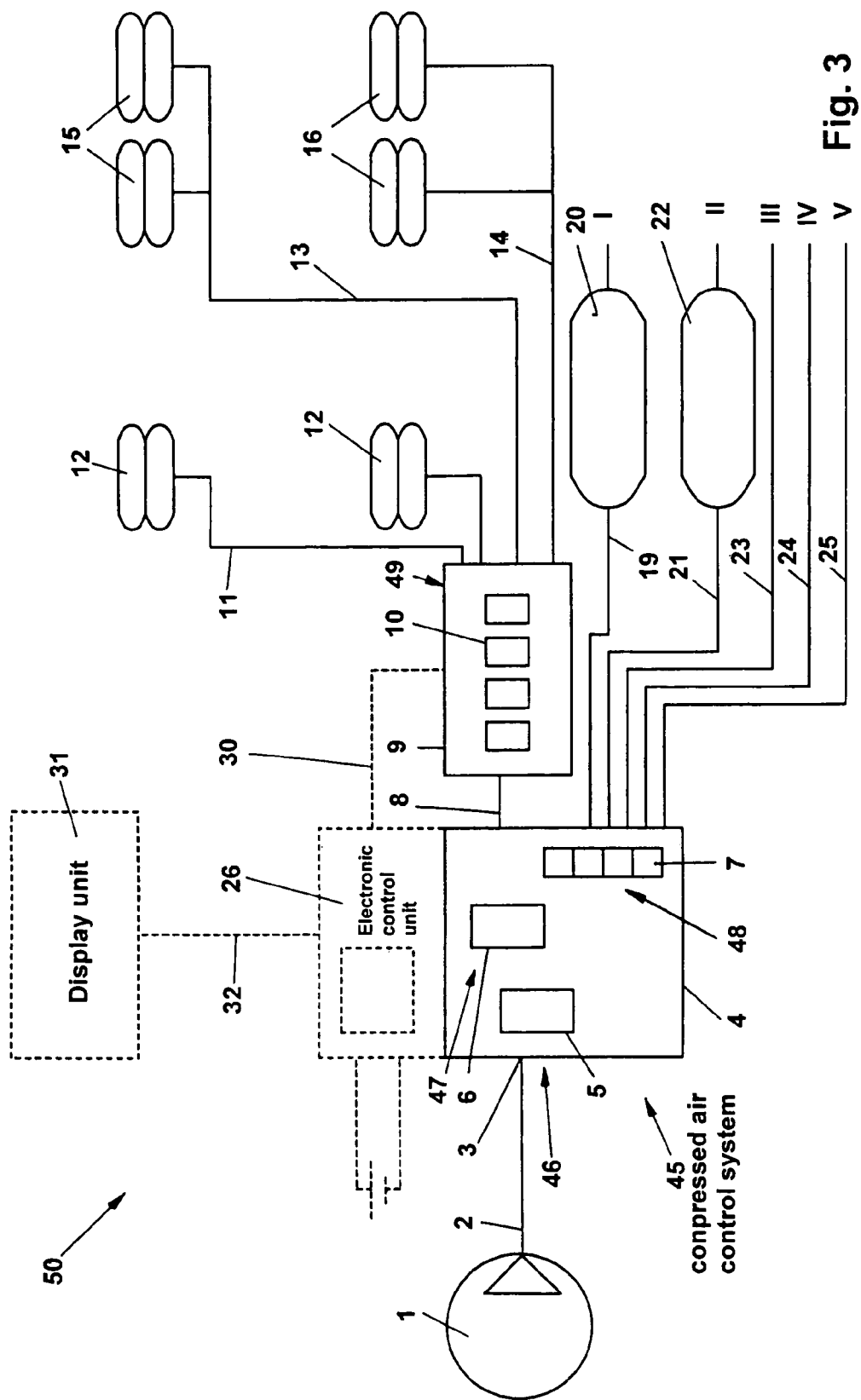
FIG. 3 is a view of a third exemplary embodiment of the novel compressed air processing system in which the common electronic control unit is associated with the elements of the compressed air processing system.

The exemplary embodiment of the novel system as illustrated in FIG. 3 has a similar design as the above described embodiment. The structural units 4 and 9 are designed to be separate as also illustrated in FIG. 1. The common electronic control unit 26 is locally associated with the structural unit 4, and it is combined therewith. The structural unit 9 is designed as a separate element. The structural unit 9 is supplied with compressed air via the conduit 8. The valves 10 of the air suspension system 49 are controlled by the electric line 30.

Figure 4:
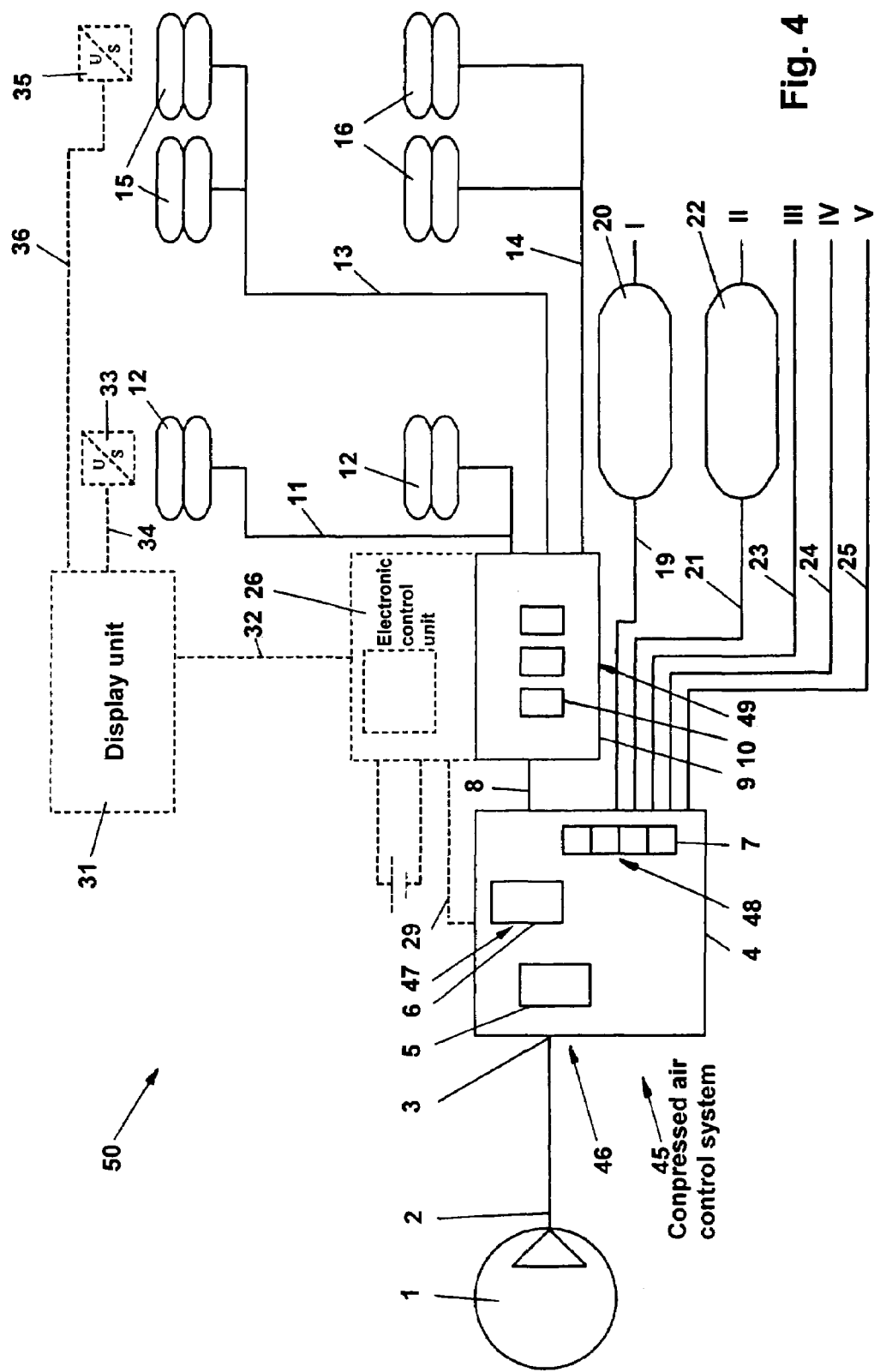
FIG. 4 is a view of another exemplary embodiment of the novel compressed air processing system in which the common electronic control unit is associated with the elements of the air suspension system.

FIG. 4 illustrates another exemplary embodiment of the novel system 45. In contrast to the system 45 illustrated in FIG. 3, the common electronic control unit 26 has been structurally combined with the structural unit 9 containing the valves 10 of the air suspension system 49.

Figure 5:
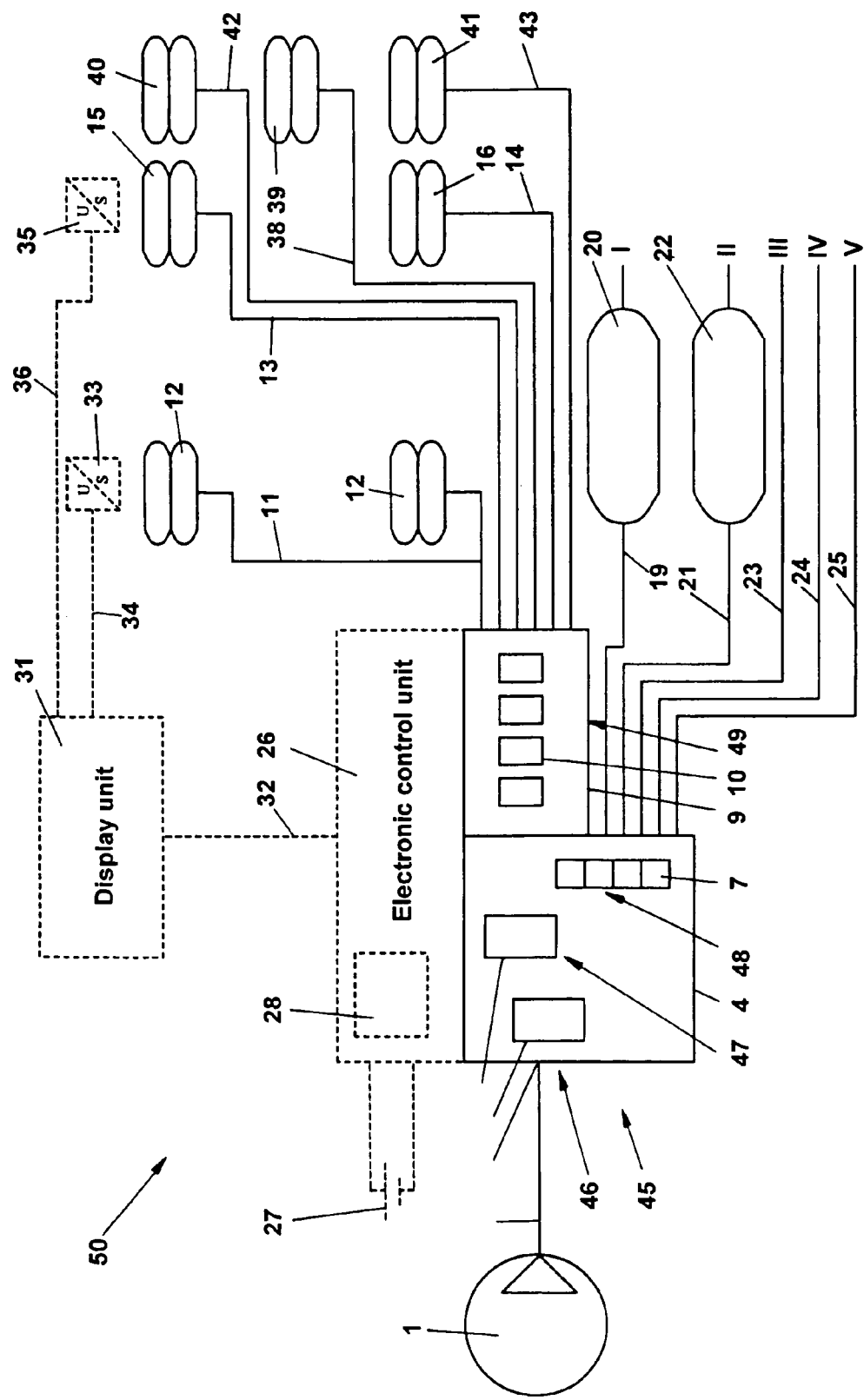
FIG. 5 is a view of another exemplary embodiment of the novel compressed air processing system in which the common electronic control unit and the pneumatic elements of the compressed air processing system and the air suspension system are designed as one structural unit.

FIG. 5 illustrates another embodiment of the system 45 in which the common control unit 26, the structural unit 4 and the structural unit 9 are structurally combined in one comparatively small location. The lines 34 and 36 lead to the display unit 31, and afterwards to the common control unit 26 via the line 32. In this way, the pneumatic elements of the structural units 4 and 9 and the electric elements of the common control unit 26 may be concentrated in one place to be arranged with reduced space requirement.

Figure 6:
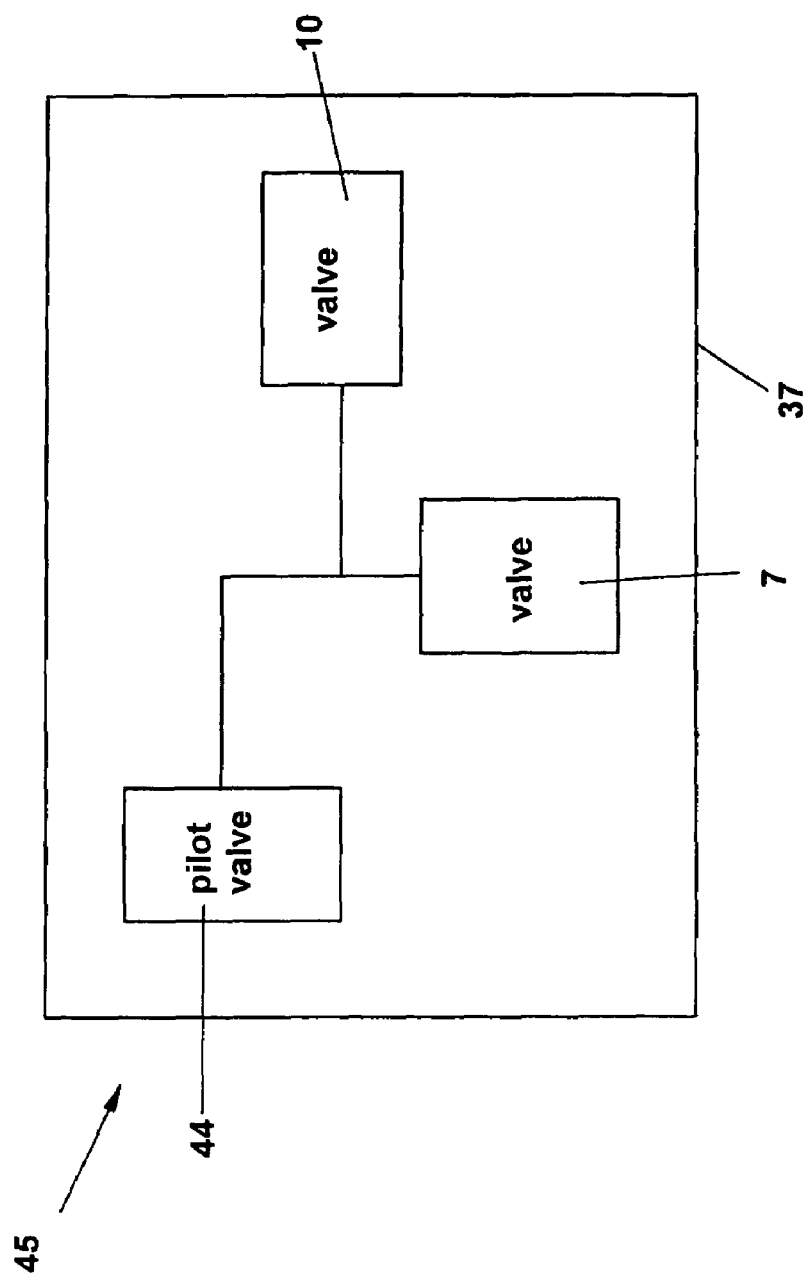
FIG. 6 is a view of another exemplary embodiment of the novel structural unit.

FIG. 6 illustrates another exemplary embodiment of the novel system 45. The novel system 45 includes a common structural unit 37 in which valves serving to process compressed air and valves of the air suspension system 49 are arranged. By way of example only, FIG. 6 only illustrates valves 7 of the multi-circuit protection valve 48 and a valve 10 of the air suspension 49 system. A pilot valve 44 is arranged in the structural unit 37. The valves 7 and 10 are commonly controlled by the pilot valve 44. The same applies to the valves 5 and 6, respectively (not illustrated).

Many variations and modifications may be made to the preferred embodiments of the invention without departing substantially from the spirit and principles of the invention. All such modifications and variations are intended to be included herein within the scope of the present invention, as defined by the following claims.

What is claimed is:

1. A compressed air processing system for motor vehicles, comprising:
    a pressure control unit including at least one valve;
    an air dryer including at least one valve;
    a multi-circuit protection valve including at least one valve; and
    an electronic control unit, said electronic control unit being designed and arranged to control said at least one valve of said pressure control unit, said at least one valve of said air dryer, said at least one valve of said multi-circuit protection valve, and at least one valve of an air suspension system which valve controls operation of the air suspension system.

2. The compressed air processing system of claim 1, wherein said at least one valve of said pressure control unit, said at least one valve of said air dryer, said at least one valve of said multi-circuit protection valve and the at least one valve of the air suspension system are designed and arranged to form a common structural unit.

3. The compressed air processing system of claim 1, wherein said at least one valve of said pressure control unit, said at least one valve of said air dryer, said at least one valve of said multi-circuit protection valve, the at least one valve of the air suspension system and said common electronic control unit are designed and arranged to form a common structural unit.

4. The compressed air processing system of claim 1, further comprising:
    a first structural unit in which said at least one valve of said pressure control unit, said at least one valve of said air dryer and said at least one valve of said multi-circuit protection valve are arranged;
    a second structural unit in which the at least one valve of the air suspension system is arranged;
    a pneumatic conduit, said pneumatic conduit being designed and arranged to connect said first structural unit with said second structural unit;
    a first electric line, said first electric line being designed and arranged to connect said common electronic control unit with said first structural unit; and
    a second electric line, said second electric line being designed and arranged to connect said common electronic control unit with said second structural unit.

5. The compressed air processing system of claim 1, wherein said at least one valve of said pressure control unit, said at least one valve of said air dryer, said at least one valve of said multi-circuit protection valve and said common electronic control unit are designed and arranged to form a common structural unit.

6. The compressed air processing system of claim 1, wherein said common electronic control unit and the at least one valve of the air suspension system are designed and arranged to form a common structural unit.

7. The compressed air processing system of claim 1, wherein said common electronic control unit further includes a common processor being designed and arranged to evaluate and control said at least one valve of said pressure control unit, said at least one valve of said air dryer, said at least one valve of said multi-circuit protection valve and the at least one valve of the air suspension system.

8. The compressed air processing system of claim 1, further comprising a pilot valve, said pilot valve being designed and arranged to control said at least one valve of said pressure control unit and the at least one valve of the air suspension system.

9. The compressed air processing system of claim 1, further comprising a pilot valve, said pilot valve being designed and arranged to control said at least one valve of said air dryer and the at least one valve of the air suspension system.

10. The compressed air processing system of claim 1, further comprising a pilot valve, said pilot valve being designed and arranged to control said at least one valve of said multi-circuit protection valve and the at least one valve of the air suspension system.

11. The compressed air processing system of claim 1, further comprising a pilot valve, said pilot valve being designed and arranged to control said at least one valve of said pressure control unit, said at least one valve of said air dryer, said at least one valve of said multi-circuit protection valve and the at least one valve of the air suspension system.

12. The compressed air processing system of claim 1, wherein said multi-circuit protection valve is designed and arranged to protect a first overall brake circuit of the motor vehicle and a second overall brake circuit of the motor vehicle, at least one valve of the air suspension system of the motor vehicle being supplied with compressed air by reservoir containers of the two overall brake circuits of the motor vehicle.

13. The compressed air processing system of claim 1, further comprising a display unit and a data line, said display unit being connected to said common electronic control unit by said data line.

14. A compressed air processing apparatus for a compressed air system, comprising:
    a pressure control unit including at least one valve;
    an air dryer including at least one valve;
    a multi-circuit protection valve including at least one valve; and
    an electronic control unit, said electronic control unit being designed and arranged to control said at least one valve of said pressure control unit, said at least one valve of said air dryer, said at least one valve of said multi-circuit protection valve, and at least one valve of an air suspension system which valve controls operation of the air suspension system.

15. The compressed air processing apparatus of claim 14, wherein said at least one valve of said pressure control unit, said at least one valve of said air dryer, said at least one valve of said multi-circuit protection valve and the at least one valve of the air suspension system are arranged in a common housing.

16. The compressed air processing apparatus of claim 14, wherein said at least one valve of said pressure control unit, said at least one valve of said air dryer, said at least one valve of said multi-circuit protection valve, the at least one valve of the air suspension system and said common electronic control unit are arranged in a common housing.

17. A compressed air system, comprising:
   an air suspension system, said air suspension system including at least one valve which valve controls operation of said air suspension system; and
   a compressed air processing system, said compressed air processing system including:
   a pressure control unit including at least one valve;
   an air dryer including at least one valve;
   a multi-circuit protection valve including at least one valve; and
   an electronic control unit, said electronic control unit being designed and arranged to control said at least one valve of said pressure control unit, said at least one valve of said air dryer, said at least one valve of said multi-circuit protection valve, and said at least one valve of said air suspension system.

18. The compressed air system of claim 17, wherein said at least one valve of said pressure control unit, said at least one valve of said air dryer, said at least one valve of said multi-circuit protection valve and said at least one valve of said air suspension system are arranged in a common housing.

19. The compressed air system of claim 17, wherein said at least one valve of said pressure control unit, said at least one valve of said air dryer, said at least one valve of said multi-circuit protection valve, said at least one valve of said air suspension system and said common electronic control unit are arranged in a common housing.

20. The compressed air system of claim 17, further comprising:
   a first housing in which said at least one valve of said pressure control unit, said at least one valve of said air dryer and said at least one valve of said multi-circuit protection valve are arranged;
   a second housing in which said at least one valve of said air suspension system is arranged;
   a pneumatic conduit, said pneumatic conduit being designed and arranged to connect said first housing with said second housing;
   a first electric line, said first electric line being designed and arranged to connect said common electronic control unit with said first housing; and
   a second electric line, said second electric line being designed and arranged to connect said common electronic control unit with said second housing.

* * * * *